(12) United States Patent  (10) Patent No.: US 7,747,451 B2
Keohane et al.  (45) Date of Patent: *Jun. 29, 2010

(54) DYNAMIC GRID PATHS

(75) Inventors: Susann Marie Keohane, Austin, TX (US); Gerald Francis McBrearty, Austin, TX (US); Shawn Patrick Mullen, Buda, TX (US); Jessica Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1594 days.

This patent is subject to a terminal disclaimer.

(21) Appl. No.: 11/014,065

(22) Filed: Dec. 16, 2004

(65) Prior Publication Data

US 2006/0136235 A1  Jun. 22, 2006

(51) Int. Cl.
*G06Q 99/00* (2006.01)
(52) U.S. Cl. ...................................... 705/1.1
(58) Field of Classification Search ................ 705/1
See application file for complete search history.

(56) References Cited

U.S. PATENT DOCUMENTS 6,594,675 B1  7/2003  Schneider

2002/0091695 A1  7/2002  Morwood

OTHER PUBLICATIONS

Keohane et al., "Method and Apparatus for Obtaining Status Information in a Grid", U.S. Utility Patent Application, filed Mar. 27, 2003, U.S. Appl. No. 10/401,323.
Genty et al., "Method and System for a Single-Sign-On Operation Providing Grid Access and Network Access", Utility Patent Application, filed Jul. 1, 2003, U.S. Appl. No. 10/610,980.

(Continued)

*Primary Examiner*—Jonathan Ouellette
(74) *Attorney, Agent, or Firm*—Dillon & Yudell LLP

(57) ABSTRACT

A system, method, data structure, and computer-readable medium for processing a command entered into a command processor interface in a data processing system. In accordance with the method of the present invention, a command is entered by a user into a command processor interface input line. A command path specified by the command processor interface is utilized for searching for the entered command. The command path includes at least one local path and a grid command directive. The grid command directive may include a grid service field containing a grid service specifier, and a host name field containing a locatable name or address of a processing or grid lookup resource. The grid command directive further includes a command field containing a grid resource lookup command. The command path searching includes sequentially processing the at least one local path and the grid command directive until an execution resource associated with the command is located.

3 Claims, 5 Drawing Sheets

OTHER PUBLICATIONS

Keohane et al., "Grid Mutual Authorization Through Proxy Certificate Generation", U.S. Utility Patent Application, filed Mar. 25, 2004, U.S. Appl. No. 10/809,551.

Keohane et al., "Apparatus, System and Method of Executing Monolithic Application Programs on Grid Computing Systems", U.S. Utility Patent Application, filed Sep. 18, 2003, U.S. Appl. No. 10/666,791.

Keohane et al., "Method and Apparatus for Detecting Grid Intrusion", U.S. Utility Patent Application, filed Apr. 22, 2004, U.S. Appl. No. 10/829,856.

Keohane et al., "Method and Apparatus for Distributing Logical Units in a Grid", U.S. Utility Patent Application, filed Mar. 6, 2003, U.S. Appl. No. 10/383,849.

Genty et al., "Method and Apparatus for Authorizing Access to Grid Resources", U.S. Utility Patent Application, filed Apr. 22, 2004, U.S. Appl. No. 10/829,931.

DYNAMIC GRID PATHS

CROSS-REFERENCE TO RELATED APPLICATIONS

The present application is related to and claims the benefit of co-pending U.S. patent application Ser. No. 10/401,323, filed on Mar. 27, 2003, titled "METHOD AND APPARATUS FOR OBTAINING STATUS INFORMATION IN A GRID," and pending U.S. patent application Ser. No. 10/610,980, filed on Jul. 1, 2003, titled "METHOD AND SYSTEM FOR A SINGLE-SIGN-ON OPERATION PROVIDING GRID ACCESS AND NETWORK ACCESS," which are incorporated herein by reference in their entirety.

BACKGROUND OF THE INVENTION

1. Technical Field

The present invention relates generally to distributed computer systems, and in particular, to a system and method enabling integration of network-based resource discovery and access into local command interpreter paths.

2. Description of the Related Art

The widespread adoption of Internet-related technology such as the HyperText Transport Protocol (HTTP) has resulted in the rapid development of a global network of millions of interconnected computers. The establishment of Wide Area Networks (WANs), such as the Internet, has spurred a trend toward organizing the computational/processing capacity of a number of computers into one or more so-called "grids," which are logical organizations of multiple computers that provide a collective sharing of computational capacity and datastore capacity while maintaining local autonomous control over individual computers.

Individual computer nodes in such a network may be configured for performing specialized data processing tasks related to specific data. It is also becoming more common to assign several different network processing nodes to "solve" a common problem, such as a complex calculation. A set of nodes participating in such a resource sharing scheme is often referred to as a "grid" or "grid network." For example, nodes in a grid network may share processing resources to perform a complex computation, such as deciphering encryption keys.

Grid computing has emerged as an important distributed processing innovation, distinguished from conventional distributed computing by its emphasis on large-scale processor resource sharing. To this end, grid platforms support sharing, exchange, discovery, selection, and aggregation of geographically/network distributed heterogenous resources including computers, databases, visualization devices, scientific instruments, etc.

At one level, grid computing comprises entering a grid task or "job" to be delivered for processing to the grid system. Examples of grid jobs include application related requests, executable commands, multi-command scripts, etc. The grid system handles such task or job requests using "grid services" that return to the requesting client a suitable response depending on the nature of the submitted job. Conventional grid computing platforms include resource sharing and discovery features such as brokers and lookup mechanisms to facilitate retrieval of data and computing resources responsive to a submitted job.

While grid architectures provide several network-side resources to assist in accessing requested resources, little if any client-side resource discovery support is provided, particularly as it relates to the command path of a local operating system. For example, a conventional grid job is submitted on a client node from which it may be executed via a browser connected to a grid server or entered as a command such as globus-managed-job-run, with the approximate syntax of, "globus-managed-job-run <remote_hostname> <job_name> <job_parameters>." In this example, "remote_hostname" designates the grid service node (sometimes referred to as a grid resource), "job_name" designates the command to be executed, and "job parameters" designates the argument parameters (often one or more filenames). This manner of grid service execution requires the client, or more specifically the user at the local client station, to realize that the requested command or task is or may be a grid job, and consequently that an alternate command entry mechanism (grid server connected browser, direct access to identified grid server, etc.) must be utilized possibly in conjunction with invoking a network access application such as a web browser. Requiring pre-knowledge of grid versus non-grid jobs is unduly burdensome given the surge in popularity of grid computing, particularly for users not directly involved in the grid networking aspects of a given data processing system.

From the foregoing, it can be appreciated that a need exists for a method, system, and computer program product that address the foregoing problems relating to the grid command processing. The present invention addresses these and other needs unresolved by the prior art.

SUMMARY OF THE INVENTION

A system, method, data structure, and computer program product for processing a command entered into a command processor interface in a data processing system are disclosed herein. In accordance with the method of the present invention, a command is entered by a user into a command processor interface input line. A command path specified by the command processor interface is utilized for searching for the entered command. The command path includes at least one local path and a grid command directive. The grid command directive may include a grid service field containing a grid service specifier, and a host name field containing a grid server address. The grid command directive further includes a command field which may contain a grid resource lookup command. The command path searching includes sequentially processing the at least one local path and the grid command directive until an execution resource associated with the command is located.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
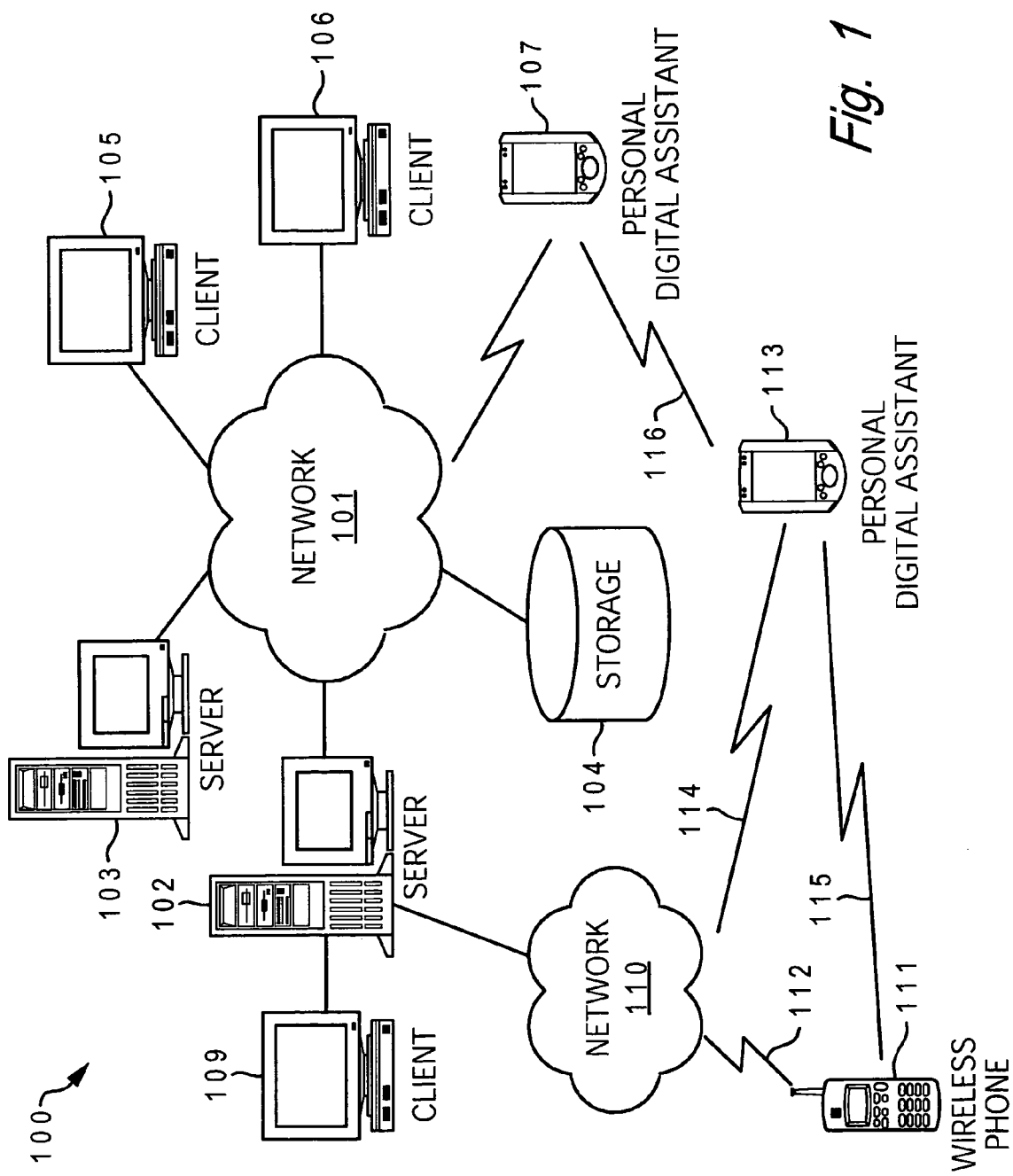
FIG. 1 illustrates a high-level pictorial representation of a network of data processing systems in which the present invention may be implemented.

The present invention is generally directed to providing transparent client-side access to grid network resources using local command path processing functionality. As utilized herein a "grid resource" or simply "resource" refers to an entity or connection providing access to computation and processing resources, access to data, access to information relating to system structure, state, and performance. As explained in further detail below with reference to the figures, the present invention synergistically merges grid resource access data into local command path processing means to facilitate seamless and transparent local user access to grid network resources.

In general, the devices that may comprise or relate to the present invention include a wide variety of data processing technology. Therefore, as background, a typical organization of hardware and software components within a distributed data processing system is described prior to describing the present invention in more detail. With reference to the figures, wherein like reference numerals refer to like and corresponding parts throughout, and in particular with reference to FIG. 1, there is depicted a typical network of data processing systems, each of which may implement a portion of the present invention. Distributed data processing system 100 contains network 101, which is a medium that may be used to provide communications links between various devices and computers connected together within distributed data processing system 100. Network 101 may include hardware connectivity, such as provided by wire or fiber optic cables, as well as logical/signal-based connectivity, such as may be provided via packet switched and wireless communications architectures. In the depicted example, multiple servers 102 and 103 are communicatively coupled to clients 105 and 106 as well as storage unit 104 via network 101. Client devices 105, 106, 107, 109, and 113 and servers 102 and 103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted embodiment, distributed data processing system 100 may include the Internet with network 101 representing a worldwide collection of networks and gateways that use various protocols to communicate with one another. Such communication protocols may include Lightweight Directory Access Protocol (LDAP), Transport Control Protocol/Internet Protocol (TCP/IP), Hypertext Transport Protocol (HTTP), Wireless Application Protocol (WAP), etc. Distributed data processing system 100 may also include a number of different types of networks, such as, for example, an intranet, a local area network (LAN), or a wide area network (WAN). For example, server 102 directly supports client 109 and a network 110, which incorporates wireless communications links. A network-enabled phone 111 and PDA 113 are communicatively coupled to network 110 through wireless links 112 and 114, respectively. Phone 111 and PDA 113 can also directly transfer data between themselves across a localized wireless link 115 using an appropriate technology, such as Bluetooth™ wireless technology, to create so-called personal area networks (PANs) or personal ad-hoc networks. In a similar manner, PDA 113 can transfer data to PDA 107 via localized wireless communications link 116. The present invention could be implemented on a variety of hardware platforms; FIG. 1 is intended as an example of a heterogeneous computing environment and not as an architectural limitation for the present invention.

As explained in further detail below with reference to FIGS. 2-5, the present invention is directed to providing transparent access to network distributed resources, and in particular, to grid network resources such as may be provided and defined within distributed data processing system 100, from any of servers 102 and 103 as well as the client-side devices such as client devices 105, 106, 109, 107, 113 and 111.

Figure 2:
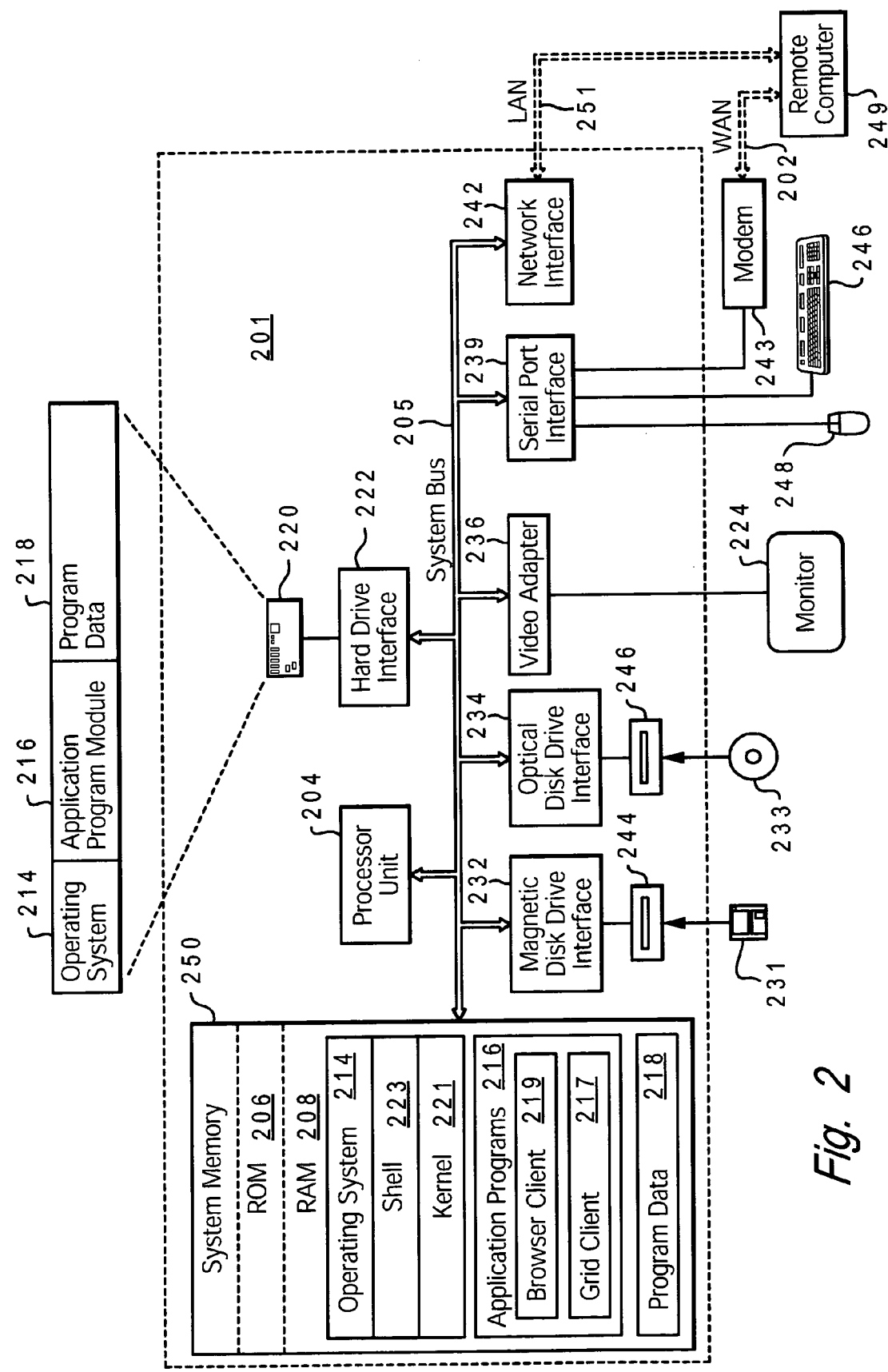
FIG. 2 is a high-level block diagram of a data processing system adapted to perform dynamic grid command path processing in accordance with the present invention.

FIG. 2 illustrates an exemplary architecture of a data processing system 201, such as may be employed by one or more of the network devices shown in FIG. 1, adapted for implementing the present invention. Specifically, data processing system 201 includes electronic and/or program product and instruction means and data for performing dynamic grid command path processing in accordance with the present invention. For discussion purposes, data processing system 201 is described as a personal computer, such as a desktop or portable computer. However, as utilized herein, the terms "data processing system," "computer," and the like, are intended to mean essentially any type of computing device or machine that is capable of running a software product, including communication devices (e.g., pagers, telephones, electronic books, etc.) and other computer-based networked devices (e.g., handheld computers, Web-enabled televisions, home automation systems, multimedia viewing systems, etc.). Those skilled in the art will appreciate that the invention may be practiced with other computer system configurations, including hand-held devices, multiprocessor systems, microprocessor-based or programmable consumer electronics, minicomputers, mainframe computers, and the like.

While the invention is described in the general context of a program running in cooperation with or as part of an operating system in a personal computer, those skilled in the art will recognize that the invention may also be implemented in combination with other types of program modules including application programs such as grid client applications and web browsers. Generally, program modules include routines, programs, components, data structures, etc. that perform particular tasks or implement particular abstract data types.

As illustrated in FIG. 2, data processing system 201 is generally configured as a personal computer (representative of one or more of client systems 105, 106, and 109 in FIG. 1) having a processor unit 204, a system memory 250, and a system bus 205 that couples system memory 250 to processing unit 204. System memory 250 includes read only memory (ROM) 206 and random access memory (RAM) 208. Data processing system 201 further includes a hard disk drive 220, a magnetic disk drive 244, e.g., to read from or write to a removable disk 231, and an optical disk drive 246, e.g., for reading a CD-ROM disk 233 or to read from or write to other optical media. Hard disk drive 220, magnetic disk drive 244, and optical disk drive 246 are connected to system bus 205 by a hard disk drive interface 222, a magnetic disk drive interface 232, and an optical drive interface 234, respectively. The drives and their associated computer-readable media provide non-volatile storage for data processing system 201. While the above description of computer-readable media refers to an on-board hard disk, a removable magnetic disk, and a CD-ROM disk, it is understood by those skilled in the art that other types of media which are readable by a functionally equivalent computer, such as magnetic cassettes, flash memory cards, digital video disks, Bernoulli cartridges, and the like, may also be used in the exemplary computer operating environment.

A number of program modules may be stored in the drives and system memory 250, including an operating system 214, application program modules 216, such as Microsoft's OFFICE suite of program modules, and program data 218. Operating system 214 runs on processor 204 and is utilized to coordinate and provide control of various components within data processing system 201. Operating system 214 may be a commercially available, such as a Unix® operating system or Windows® XP, which is available from Microsoft Corporation. An object oriented programming system such as Java may run in conjunction with operating system 214 and provide calls to the operating system from Java programs or applications executing on data processing system 201. "Java" is a trademark of Sun Microsystems, Inc. Instructions for operating system 214 and other programs or applications are located on storage devices, such as hard disk drive 220, and may be loaded into system memory 250 for execution by processor 204.

A user may enter commands and information into data processing system 201 through a keyboard 246 and pointing device, such as a mouse 248. Other input devices (not shown) may include a microphone, joystick, game pad, satellite dish, scanner, or the like. These and other input devices are often connected to processing unit 204 through a serial port interface 239 that is coupled to system bus 205, but may be connected by other interfaces, such as a game port or a universal serial bus. A monitor 224 or other type of display device is also connected to system bus 205 via an interface, such as a video adapter 236.

Data processing system 201 may operate in a networked environment using logical connections to one or more remote computers, such as a remote computer 249. The remote computer 249 may be a server, a router, a peer device or other common network node, and typically includes many or all of the elements described relative to data processing system 201. The logical network connections depicted in FIG. 2 include a LAN 251 as well as a WAN 202. Such networking environments are commonplace in offices, enterprise-wide computer networks, Intranets and the Internet.

When used in a LAN networking environment, data processing system 201 is communicatively coupled to LAN 251 through a network interface 242. When used in a WAN networking environment, data processing system 201 typically includes a modem 243 or other means for establishing communications over WAN 202, such as the Internet. Modem 243, which may be internal or external, is connected to system bus 205 via serial port interface 239. In a networked environment, program modules depicted relative to data processing system 201, or portions thereof, may be stored in one or more remote (i.e., network distributed) memory storage devices. It will be appreciated that the network connections shown are exemplary and other means of establishing a communications link between the computers may be used.

In the depicted embodiment, application programs 216 include a web browser client application 219 and a grid client application 217. Browser client 219 includes program modules and instructions enabling a world wide web client (i.e., a user having a web address) to send and receive network messages over WAN 202, representing the Internet using HTTP messaging. Possibly operating in conjunction with and/or as facilitated by browser client 219, or as a standalone application, grid client 217 fundamentally serves as a client interface for accessing various grid resources and services. As explained in further detail below, a grid client such as grid client 217 typically includes electronic processing and/or program instruction means that, responsive to being invoked, establish communication exchange with grid resources and grid resource lookup, allocation, and scheduling services such as may be provided by so-called grid brokers.

Figure 3:
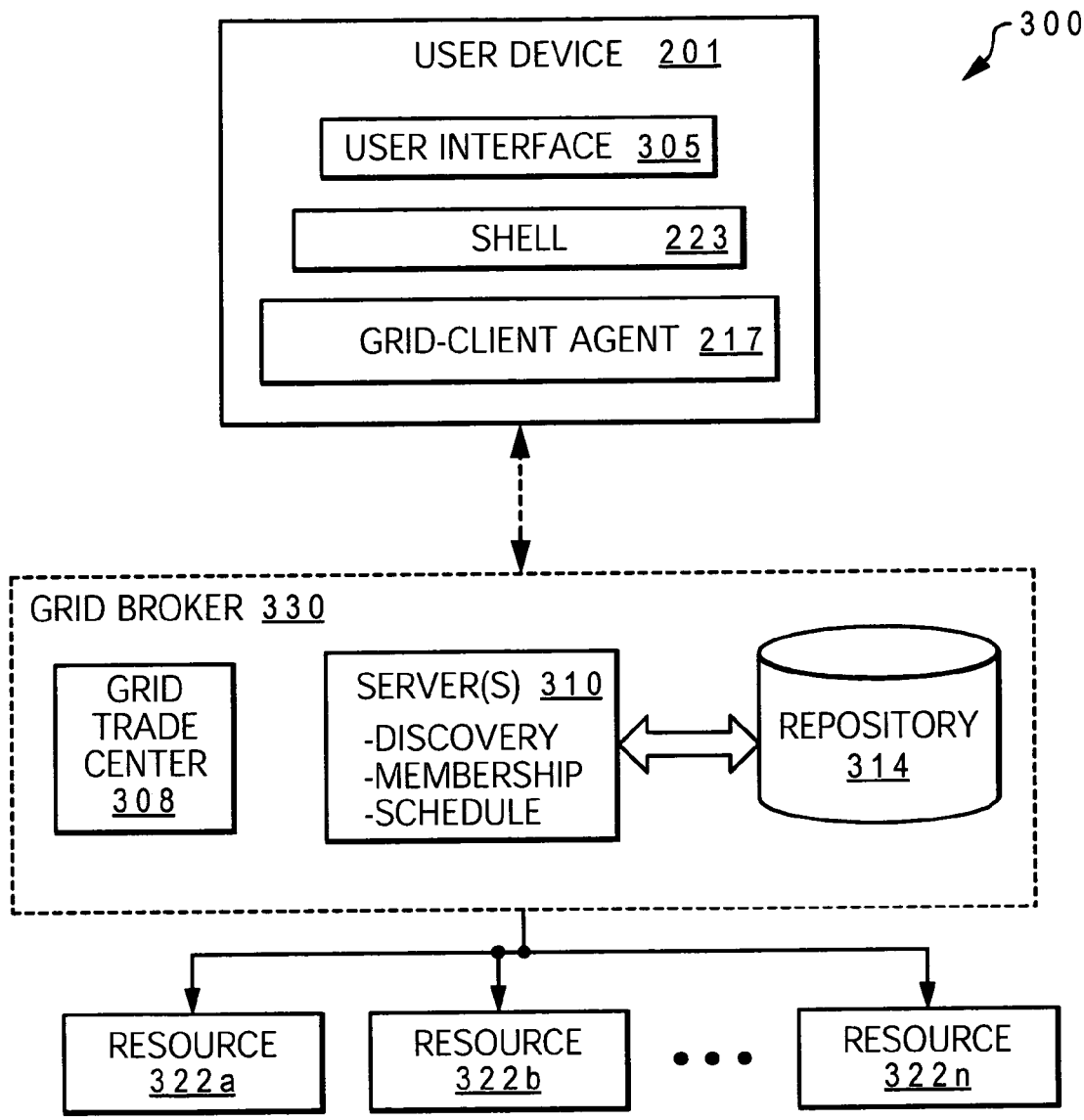
FIG. 3 is a high-level block diagram of a grid computing system adapted to implement dynamic grid command path processing in accordance with a preferred embodiment of the present invention.

With reference to FIG. 3, there is depicted a high-level block diagram of a grid computing system adapted to implement dynamic grid command path processing in accordance with a preferred embodiment of the present invention. As shown in FIG. 3, the grid computing system of the present invention includes several of the network and data processing features illustrated in FIGS. 1 and 2. Specifically, the depicted grid computing system generally comprises a user device in the form of client-side data processing system 201 having grid client 217 running thereon. The grid computing system further comprises multiple servers, represented by block 310, communicatively coupled to one or more data repositories 314, grid trade centers 308, and grid resources 322a-322n. Grid servers 310 may be, for example, IBM eServer pSeries systems, a product of International Business Machines Corporation in Armonk, N.Y., running the Advanced Interactive Executive (AIX) operating system or LINUX operating system.

Grid servers 310, repository 314, and grid trade center 308 functionally form one or more grid brokers, represented by block 330. Particularly, when a request from data processing system 201 requires a program to be processed by the grid computing system, one or more of servers 310 are accessed by grid client 217 as directed by commands entered by a user via user interface 305. Upon receiving a request, a server 310 will consult data repository 314 to determine which resources 322 are available to process the program. In this example, server 310 indicates that resources 322, which may comprise one or more data processing systems such as those illustrated in FIG. 1, are able to process the program. Using this information, the client system 201 then establishes accounts with resources 322 through grid trade center 308. Data processing system 201 then notifies server 310 which responds by scheduling the program for processing according to the availability of grid resources 322.

In the prior art, such a grid processing request would typically include entering the request via user interface 305 as a grid "job" to be delivered for processing to the grid system. Given the highly remote and distributed nature of grids and grid resources, the grid job request submitted by a user has traditionally included an extended grid path identifier specifying, per submitted job request, the identity of the grid resources and/or grid lookup resources to be utilized. For example, a conventional grid job may be submitted as a command on user interface 305 using an executable command, such as "job-run," that expressly invokes grid client 217 and includes other command line syntax specifying grid-specific arguments such as, <remote_hostname>, specifying the address of server 310, <job_name>, which specifies the name of the program to be executed, and <job_parameters> which may specify data or programs utilized in processing the program. In this example, "remote_hostname" specifies a grid node (such as grid server 310), "job_name" designates the command to be executed, and "job parameters" designates the argument parameters (often one or more filenames). This manner of grid service execution requires the user at the client data processing system 201 to pre-determine that the command is grid-related and to expressly enter the command as a multi-parameter command line executable. This extended grid path command requires the user issuing the request to specify an identity of grid resources and/or grid lookup resources such as grid brokers, remote hosts, etc. Such grid-related command path specification presents an undue burden on many users who are not conversant in information-technology and grid resource processing.

The method and system of the present invention provide a client-side grid command processing mechanism enabling grid requests to be transparently incorporated into the user's shell command processing environment without the need for the user to expressly specify an extended grid-centric command path in conjunction with invoking grid client 217. To this end, the embodiment depicted in FIG. 3 further includes a command interpreter program or shell 223 typically incorporated in a higher level operating system layer and utilized for providing transparent user access to grid resources such as resources 322.

As is well known in the art, a command interpreter or "shell" is generally a program that provides an interpreter and interfaces between the user and the operating system. More specifically, a shell program executes commands that are entered into a command line user interface or from a file.

The shell (Unix) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g. the kernel) for processing. The present invention employs a dynamic grid pathname syntax and shell program for processing the same that enable grid jobs to be seamlessly delivered and processed directly from the operating system shell user command entry interface. As explained in further detail below, the shell program of the invention includes program instruction means for processing a "grid directive" (alternatively referred to herein as a "grid command directive") that is included in the shell command path for enabling such transparent grid resource access.

Figure 4:
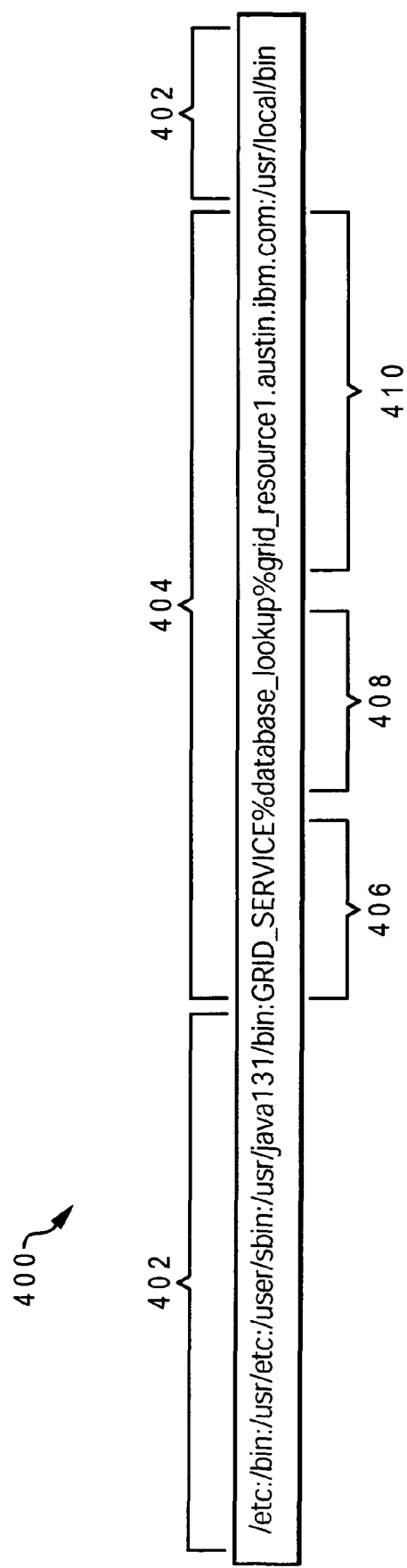
FIG. 4 illustrates a command path incorporating a grid directive in accordance with the present invention.

Referring now to FIG. 4, there is illustrated a command path incorporating a grid command directive in accordance with the present invention. Specifically, a command path 400 is depicted which includes several local path strings 402 separated by colons in accordance with many pathname conventions. As is known in the art, a command path is essentially a list of directory names that are searched by the shell program to locate a command entered on the shell command line. Assuming the depicted embodiment employs the Unix operating system, when the user enters "ls" on the shell command line, the shell program, such as shell 223, having command path 400 will sequentially search the directories specified by path strings 402 until it finds the executable file called "ls" and executes it. Command path 400 is a data structure that may be system and/or user specified and stored in the memory of the host data processing system for access when the operating system is loaded during system startup.

In accordance with the present invention, command path 400 further includes a grid directive 404 that is processed as described in further detail with reference to FIG. 5 responsive to the user entering a command that requires grid resource processing. In a preferred embodiment, and as shown in FIG. 4, grid directive 404 includes multiple fields syntax demarcated by percent signs. The first field 406, denoted GRID_SERVICE, is essentially a flag specifying to the shell program that the presently processed "path string" is a grid directive and prompting the shell program to process the subsequent fields 408 and 410 accordingly. The second field 408, denoted database_lookup, is a path-specified command to be delivered to one or more grid servers specified by the third field 410, denoted grid_resource1.austin.ibm.com. Consistent with the spirit and scope of the invention, the grid resource specified in field 410 may be a grid lookup resource, such as one or more of servers 310, which perform membership tracking and discovery functions for finding grid processing resources (e.g. resources 322), which execute the command. Furthermore, while a single grid directive 404 is shown in the depicted embodiment, it should be noted that an alternate embodiment may employ multiple such directives into a command path. In this manner, the shell program will sequentially traverse multiple grid options similar in principle to the multiple local paths traditionally provided in the command path. Additionally, and as explained below with reference to FIG. 5, a preferred embodiment provides for dynamically modifying the grid resource specified in field 410 of grid directive 404 in accordance with network-side processing, and particularly grid resource lookup and allocation processing in which the lookup command is redirected (such as by conventional grid lookup or resource balancing mechanisms) to an alternate grid resource provider such as another grid server.

Figure 5:
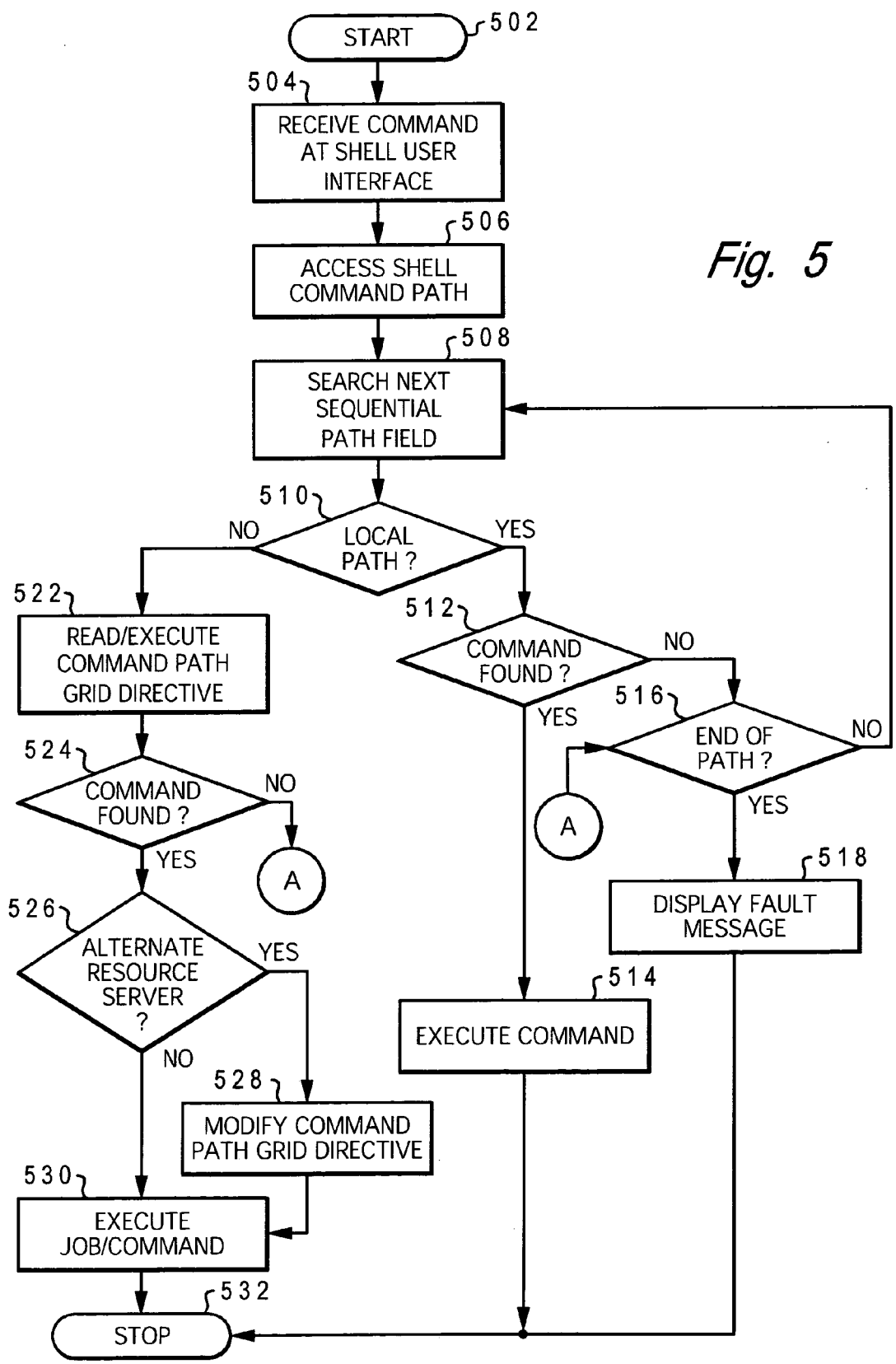
FIG. 5 is a high-level flow diagram depicting steps performed during command line processing in accordance with the present invention.

Referring to FIG. 5 in conjunction with FIGS. 1-4, a preferred method of processing a shell command path as may be implemented using distributed data processing system 100, data processing system 201, grid processing system 300, and command path 400 is now described. The process begins as shown at step 502 and proceeds to step 504 with a user-entered command being received at the shell user interface 305, which may be any command processor interface in which the user directly enters or selects a command for execution. Next, responsive to the shell being invoked (such as by the user selecting "enter" after typing in the command), shell program 223 accesses and commences a sequential search of command path 400 to resolve the entered command as depicted at step 506.

Proceeding to step 508, shell program 223 commences or continues the sequential traversal of command path 400 by reading and searching a next command path field such as the /etc, /bin, /usr/etc, and /usr/local/bin path fields demarcated by colons and contained within command path 400. As explained above with reference to FIG. 4, the path fields within command path 400 include at least one local path and a grid command directive. Inquiry block 510 therefore represents the result rather than an active determination of whether or not the presently search path field specifies a local path (e.g. a directory path specifying a file and/or data storage location directly addressed by the local operating system). As utilized herein, a "local path" is preferably a local directory path specifying a file system resource allocation space that is directly controlled and managed by the local operating system. In alternate embodiments, "local path" may be extended to include any data storage specifier such as formulated by a file system or other data management system at which the local shell program searches for the command and/or associated data/files entered into the shell command prompt.

If the presently processed path field specifies a local path and the command and/or associated file is found at the specified path location, the command is executed in accordance with shell path convention and the process concludes (steps 512, 514, 532). As illustrated at steps 512 and 516, the sequential search process continues to traverse command path 400, returning to step 508, if the command is not found at the searched path location. As depicted at steps 512, 516, and 518, responsive to the command not being found at the presently processed local path in which the presently processed path is the last in the command path sequence (e.g. /usr/local/bin in FIG. 4), a fault message is displayed to the user and the process terminates as shown at step 532.

Step 522 depicts the reading and execution of the grid directive within grid directive field 404. Specifically, and returning to the path field characterization depicted at step 510, if the presently accessed "path" is not local, and more specifically, responsive to shell program 223 reading the grid service field 406 of grid directive 404, the grid command (designated "database_lookup" in FIG. 4) specified by field 408 is delivered to the grid resource specified by field 410. Such delivery is supported by grid client 217, possibly in conjunction with browser 219. For example, and as part of the processing of the grid service specified in grid service field 406, grid client application 217 is called/invoked by the shell program 223. In a preferred embodiment, the grid client application 217 is invoked using a specified shell environment variable. Specifically, a shell environment variable GRID_SERVICE is set to access the executable for a preferred grid client application 217 at a specified local directory location. For example, a grid client executable command "globus run" is accessed and executed responsive to shell 223 executing the environmental variable GRID_SERVICE <arguments> contained in grid service fields 406, 408, and 410.

Grid client 217 proceeds with the execution of the grid command specified in grid directive 404 executing a grid lookup command having a host name argument, a job name argument, and a job parameter argument. In the exemplary embodiment, and consistent with the lookup function of the shell program, the command originally received from the user at step 504 becomes the argument in the grid command lookup. Thus, assuming the command RUN_TEST has been received at step 504, the grid service executable "database_lookup" is sent to server grid_resource1.austin.ibm.com which interprets and executes "database_lookup" in accordance with the native grid processing convention such as may require searching repository 314 for the module or program named RUN_TEST.

Responsive to the user-entered command and/or its associated file not being found by the grid resources searched in accordance with the grid directive or the grid lookup resources summoned thereby (step 524), the process continues as illustrated at steps 516, 508, 518, and 532 with the next path field being accessed or the process terminated if the end of the command path has been reached.

As depicted at steps 526 and 528, the grid directive processing of the present invention preferably includes a command path feedback feature, which may be implemented by grid client 217 in cooperation with shell 223, that enables the grid directive 404 to be changed in accordance with grid resource location and scheduling functions performed during the processing of the grid directive (step 510). For example, if the requested server (e.g. grid_resource1.austin.ibm.com) or another grid resource entity re-directs the "database_lookup" job to another grid resource for load balancing or other reasons, the grid client 217 directly handling the grid resource communication delivers a message or command to shell 233 or other program instructing the command path variable 400 to be modified to reflect the lookup redirection. Such a modification (step 514) may therefore entail changing the grid resource address specified in field 410 of grid directive 404. In this manner, dynamic grid path processing would be implemented by adding and subsequently dynamically modifying the grid directive 404 within the shell PATH environment such that the shell issues the command as a submitted grid job when it reaches this directive in the PATH. For example, the shell environment variable set within a specified directory such as etc/environment, may specify a particular grid server to which the job or command is to be submitted. The server specification in the shell environment variable may be modified to specify an alternate server responsive, for example, to a grid scheduler redirecting the job to the alternate server for load balancing reasons.

Whether necessitating a grid resource address modification or not, if the grid lookup command performing a pseudo-shell lookup function at step 510 locates the user-entered command and/or an execution resource associated therewith (e.g. an executable file), the command or "grid job" is executed using the located and allocated grid resources and the process terminates (steps 530 and 532).

The disclosed methods may be readily implemented in software using object or object-oriented software development environments that provide portable source code that can be used on a variety of computer or workstation hardware platforms. In this instance, the methods and systems of the invention can be implemented as a routine embedded on a personal computer such as a Java or CGI script, as a resource residing on a server or graphics workstation, as a routine embedded in a dedicated source code editor management system, or the like.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for processing a command, said method comprising:

receiving the command entered into a command processor interface in a data processing system, wherein said command is entered by a user or a program running on said data processing system;

searching for the command using a command path specified by the command processor interface, wherein the command path includes at least one local path and a grid command directive, wherein said grid command directive includes (a) a command field containing a grid resource lookup command and (b) a grid service field containing a grid service specifier and a host name field containing a grid server address and specifying a grid host device;

searching for an execution resource associated with the entered command in accordance with the grid host device specified by said host name field, wherein said searching further includes processing the grid service specifier in the grid command directive, and said processing the grid service specifier includes invoking a client grid application;

wherein said invoking a client grid application includes (a) executing a grid application command having a host name argument, a job name argument, and a job parameter argument, (b) utilizing the grid resource lookup command as the job name argument, (c) utilizing the grid server address as the host name argument, and (d) utilizing the command entered into the command processor interface as the job parameter argument, responsive to a redirection of said searching for an execution resource to an alternate grid host device, modifying said host name field to specify said alternate grid host device; and sequentially processing the at least one local path and the grid command directive until an execution resource associated with the command is located.

2. A computer-readable storage medium having encoding therein computer-executable instructions for causing a data processing system to perform:

receiving a command entered into a command processor interface in a data processing system, wherein said command is entered by a user or a program running on said data processing system;

searching for the command using a command path specified by the command processor interface, wherein the command path includes at least one local path and a grid command directive, wherein said grid command directive includes (a) a command field containing a grid resource lookup command and (b) a grid service field containing a grid service specifier and a host name field containing a grid server address and specifying a grid host device;

searching for an execution resource associated with the entered command in accordance with the grid host device specified by said host name field, wherein said searching further includes processing the grid service specifier in the grid command directive, and said processing the grid service specifier includes invoking a client grid application;

wherein said invoking a client grid application includes (a) executing a grid application command having a host name argument, a job name argument, and a job parameter argument, (b) utilizing the grid resource lookup command as the job name argument, (c) utilizing the grid server address as the host name argument, and (d) utilizing the command entered into the command processor interface as the job parameter argument, responsive to a redirection of said searching for an execution resource to an alternate grid host device, modifying said host name field to specify said alternate grid host device; and sequentially processing the at least one local path and the grid command directive until an execution resource associated with the command is located.

3. A data processing system, comprising:

a processor; and a computer-readable storage medium coupled to the processor and having encoding therein computer-executable instructions for causing the processor to perform:

receiving a command entered into a command processor interface in a data processing system, wherein said command is entered by a user or a program running on said data processing system;

searching for the command using a command path specified by the command processor interface, wherein the command path includes at least one local path and a grid command directive, wherein said grid command directive includes (a) a command field containing a grid resource lookup command and (b) a grid service field containing a grid service specifier and a host name field containing a grid server address and specifying a grid host device;

searching for an execution resource associated with the entered command in accordance with the grid host device specified by said host name field, wherein said searching further includes processing the grid service specifier in the grid command directive, and said processing the grid service specifier includes invoking a client grid application;

wherein said invoking a client grid application includes (a) executing a grid application command having a host name argument, a job name argument, and a job parameter argument, (b) utilizing the grid resource lookup command as the job name argument, (c) utilizing the grid server address as the host name argument, and (d) utilizing the command entered into the command processor interface as the job parameter argument, responsive to a redirection of said searching for an execution resource to an alternate grid host device, modifying said host name field to specify said alternate grid host device; and sequentially processing the at least one local path and the grid command directive until an execution resource associated with the command is located.

* * * * *